UNITED STATES PATENT OFFICE 2,431,499

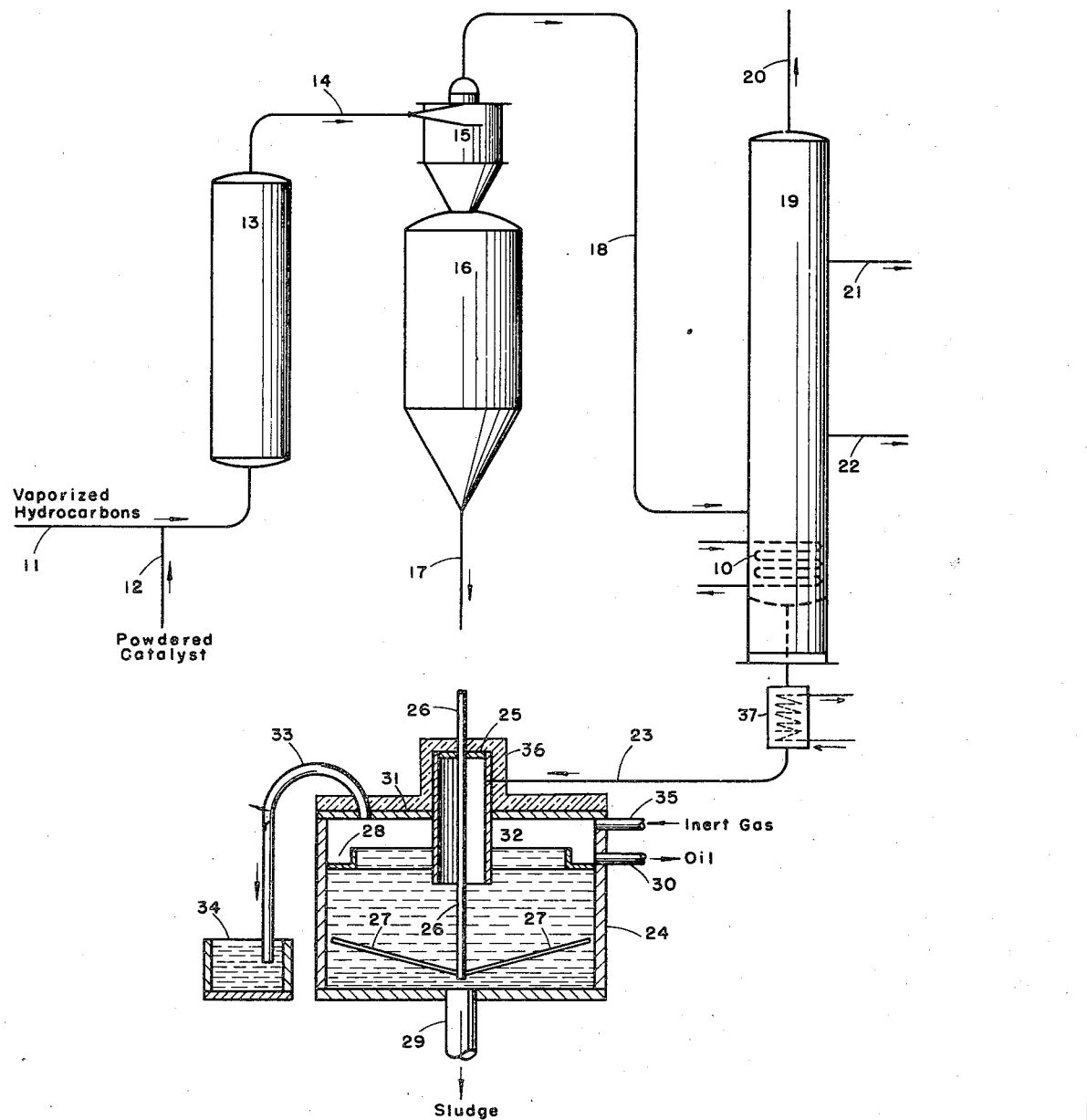

SETTLING CATALYSTS FROM OIL HAVING AN INERT GAS THEREABOVE

Jewell S. Palmer, Wooster, Tex., assignor to Standard Oil Development Company, a corporation of Delaware Application August 21, 1944, Serial No. 550,394

3 Claims. (Cl. 210—55)

The present invention is directed to a method for operating a sedimentation device employed in the separation of finely divided catalyst from hydrocarbon oils. More specifically, the invention is directed to the operation of a sedimentation device or classifier in the separation of catalyst in finely divided form from a hydrocarbon oil of such viscosity as to require the maintenance of the oil at a relatively high temperature in order to allow the settling of the finely divided particles from the oil.

A preferred embodiment of the present invention will now be described in conjunction with the drawing, in which the sole figure is in the form of a diagrammatic flow sheet.

Vaporized or liquid hydrocarbons are passed into inlet line 11 and there admixed with finely divided catalyst introduced by inlet line 12. The mixture of hydrocarbons and powdered catalyst is then allowed to flow onwardly through line 11 and enters into the lower end of reactor vessel 13. The vaporous hydrocarbons and catalyst leave the upper end of reactor 13 via line 14 and are passed into cyclone separator 15, wherein the hydrocarbon vapors and the catalyst are separated by centrifugal force. The spent catalyst drops downwardly from cyclone 15 into spent catalyst hopper 16, where it is accumulated prior to being sent by way of line 17 to a regenerator means, not shown. The vapors are withdrawn from cyclone 15 through line 18 and are passed to a distillation column 19. The vapors introduced into fractionating column 19 by line 18 carry suspended therein a small quantity of finely divided catalyst which is not removed by cyclone 15. The amount of catalyst carried by the vapors in line 18 will range from about 10 to 50 tons per day for the usual commercial size unit. This catalytic material is ultimately suspended in the heaviest fraction removed from the distillation column 20, and provision must be made for the recovery of this catalyst in order to prevent a serious loss from the system.

It is to the recovery of the catalytic material accumulating in the bottom of fractionator 19 that the present invention is specifically directed.

If a gas oil is employed as the charging stock entering the system via line 11, the converted oil fractionated in column 19 may be divided into an overhead fraction boiling below 400° F., a light side stream, a heavier side stream and a bottoms having an initial boiling point of about 500° F. In the drawing the lightest fraction is withdrawn as overhead through outlet 20, the light side stream fraction is withdrawn through line 21, the heavier side stream fraction through line 22 and the bottoms containing the finely divided catalyst in suspension is removed through outlet 23. It will be understood that column 19 is a conventional fractionating column and is provided with a heating coil 10 to furnish heat to the liquids passed into the column in order to maintain a suitable degree of vaporization within the column. When treating a fraction having the characteristics above described, the fractionator operates at a bottom temperature in the range of 500° to 600° F. and at a pressure between 7 and 8 pounds per square inch.

The bottoms fraction is sent through line 23 to a sedimentation device or classifier 24 in order to allow the separation of catalyst in the form of a slurry from a supernatant layer of clarified oil which may be separately withdrawn from the classifier. The construction of classifiers and their operation is conventional to the art, being described, for example, in the Chemical Engineer's Hand Book, McGraw-Hill, 1934, pages 1348 to 1379. For this reason the showing of the classifier in the drawing of the present application is schematic only and does not include the driving means or the specific construction of the radial arms employed for moving the settled solids. In the drawing the central feed well 25, shaft 26, radial arms 27, collection trough 28, sludge discharge outlet 29 and clarified liquid discharge outlet 30 are shown. It is to be understood that other conventional equipment for classifiers including a means for rotating shaft 25 and a pump suitable for moving the settled sludge through outlet 29 are to be used, but these conventional details are not shown in the drawing.

In the sedimentation device the temperature of operation is maintained in the range of 400° to 450° F. in order that the viscosity of the oil may be sufficiently small to allow settling of the finely divided catalyst from the oil. Under usual conditions of operation the hot bottoms fraction may be discharged directly from fractionator 19 into the thickener 24 to maintain a temperature in the desired range within the thickener. It will be understood, however, that if desired a heating or cooling means 37 may be arranged in line 23 to adjust the temperature of the mixture being fed into the thickener.

The catalyst suspended in the oil and discharged from fractionator 19 through line 23 may be considered partially spent, but it is in some measure effective for use as a catalyst if recycled to the reactor without regeneration. In any event, it is desirable to eliminate contact of the catalyst with oxygen. In order to prevent contact between the suspension and the atmosphere, the classifier 24 is provided with a top or roof 31 defining a vapor space 32 between the top of the liquid in the thickener and the roof of the thickener. As a safety measure a vent or conduit 33 is provided leading from the roof to a point substantially below the liquid level of the thickener, with the lower end of the vent terminating in a liquid filled vessel 34. It will be understood that if an explosion occurs in the vapor space, the vent allows the release of pressure within the classifier without damage to the structural members thereof.

In catalytic cracking operations employing a finely divided catalyst it is conventional to employ an alumina-silica catalyst which has a low density. This catalyst is finely divided so that the average particle size is within the range of 20 to 80μ. The low density and small particle size of the catalyst make imperative the maintenance of a quiescent condition within the settler in order to have a separation of the catalyst from the major portion of the oil. It has been before explained that the viscosity of the oil is such as to require a high temperature to be maintained within the settling chamber to allow the settling of the catalyst from the oil.

I have now found that in conventional operations a minute quantity of water is almost invariably present in the classifier. The source of this water is not precisely known, but as a hypothesis it has been suggested that it is added to the reactants by leaks in steam heat exchangers and is not entirely removed in the fractionating column 19. Other explanations of the presence of the water are that it may remain in the thickener 24 when the thickener is steamed out in cleaning, or may accumulate in the vapor space when water is employed as the liquid in vessel 34 as the seal in the vent pipe. It is to be understood that the amount of water which has been found to accumulate in the thickener is very small and is usually in the range of 2 to 5 parts of water per 10,000 parts of oil. It has been found that when the fraction is passed from column 19 to settler 24 and the mixture then maintained in a heated condition for a number of hours in order to aid the effective settling of the catalyst, the small amount of water accumulated in the vessel becomes concentrated as water vapor in vapor space 32. The roof 31 of the thickener is cooled by contact with the atmosphere and causes the condensation of water vapor on the under side thereof, and this accumulated vapor then drips back into the body of the suspension within the thickener 24. When the drops of water strike the heated oil, they are vaporized and again evaporated into the vapor space. The cycle of the water condensing on the roof, dropping into the slurry and then vaporizing prevents the maintenance of suitable quiescent conditions within the settler and results in the upper portion of the body of oil retaining substantial amounts of solid catalyst in suspension.

In accordance with the present invention the vapor space above the body of slurry is purged by a gas incapable of oxidizing the finely divided catalyst in the slurry undergoing settling in the vessel. The inert gas employed for purging the vapor space removes condensable vapors from the space and in turn eliminates the condensation of vapors on the roof of the tank and the return of the condensate to the pool of suspension being settled.

Non-condensable gases which are suitable for purging the vapor space include methane, nitrogen, carbon dioxide or flue gas. In the drawing the purging gases are injected into the vapor space via inlet line 35 under sufficient pressure to allow them to sweep the vapors from vapor space 32 out through vent pipe 33 and the liquid seal in vessel 34. The purging gas may be introduced into vapor space 32 continuously or intermittently, at the option of the operator. It is preferred to pass the purging gas through the vapor space continuously, but if desired the purging gas may be used intermittently if the period between the injection of the gas is maintained suitably short to prevent the condensation of appreciable amounts of condensate on the roof of the settling vessel. It is desirable to supplement the action of the purging gas in vapor space 32 by the application of a suitable insulating material 36 on the upper side of roof 31, which serves to reduce the condensation of vapors on the under side of the roof.

In a plant installation a thickener was employed having a tank 20 feet in diameter and 10 feet in height. The slurry oil with catalyst suspended therein removed as bottoms from the fractionator towers of a catalytic cracking unit was discharged into the settling tank at a temperature of approximately 425° F. The clarified oil withdrawn from the operation of the thickener contained approximately 1.1 pounds of catalyst per barrel of oil. The substantial portion of catalyst in the clarified oil was due to vigorous bubbling at the surface of the settling tank. The vapor space above the settling tank was then purged by the continuous introduction of natural gas into the vapor space at the rate of approximately 200 cubic feet of gas per hour, with the gas being withdrawn through the overflow vents of the settling tank. Upon the introduction of purging gas into the vapor space of the settler the amount of catalyst in the clarified oil was reduced, and 24 hours after the introduction of the purging gas the clarified oil withdrawn from the settling tank contained 0.1 pound of catalyst per barrel of oil. Continued operations employing the purging gas were maintained at the satisfactory figure of no more than 0.1 pound of catalyst per barrel of oil withdrawn from the settling tank.

It is to be understood that the above example is given only by way of illustration and is not intended by way of limitation. For example, instead of employing natural gas as the purging agent, other non-condensable gases may be employed, and the amount of purging gas may be varied over a substantial range with the introduction of the gas either intermittently or continuously, as desired.

Having fully described the present invention, what I desire to claim is:

1. A method for the removal of finely divided solid catalyst from a liquid hydrocarbon oil comprising the steps of introducing a mixture of said oil and said catalyst into a settling vessel arranged with a vapor space above the upper surface of the oil to prevent contact between the atmosphere and the surface of the oil, maintaining said mixture in said vessel under a temperature substantially greater than the boiling point of water, passing inert gas through the vapor space to purge said space of condensible vapors, settling said catalyst from said mixture under the influence of gravity, and separately removing clarified oil and settled catalyst from said settling vessel.

2. A method for the settling of a mixture comprising finely divided alumina-silica catalyst and liquid hydrocarbon oil including the steps of withdrawing said mixture from a reaction zone at a temperature substantially above the boiling point of water, forming a pool of said mixture in a settling vessel arranged to prevent contact between the atmosphere and the upper surface of the pool and to provide a vapor space above said pool, maintaining said pool at a temperature substantially above the boiling point of water, passing inert gas through the vapor space above said pool to sweep condensible vapors therefrom, separating said catalyst from said oil by settling and separately removing clarified oil and settled catalyst from said settling vessel.

3. A method in accordance with claim 2 in which the size of the catalyst particles is within the range of 20 to 80μ, the oil has an initial boiling point of 500° F., and in which water is initially present in the settling vessel in amounts ranging from 2 to 5 parts of water per 10,000 parts of oil.

JEWELL S. PALMER.

REFERENCES CITED

The following references are of record in the file of this patent:

UNITED STATES PATENTS

| Number | Name | Date |
|---|---|---|
| 1,762,585 | Pearl | June 10, 1930 |
| 1,159,044 | Kelly, Jr. | Nov. 2, 1915 |
| 2,343,836 | Weber | Mar. 7, 1944 |
| 2,355,875 | Lasseter | Aug. 15, 1944 |
| 2,277,053 | Alexander et al. | Mar. 24, 1942 |
| 1,686,203 | Coe | Oct. 2, 1928 |
| 2,165,820 | Smyers | July 11, 1939 |
| 2,307,154 | Osuna | Jan. 5, 1943 |
| 2,349,787 | Haswell | May 23, 1944 |
| 2,384,967 | Schumacher et al. | Sept. 18, 1945 |
| 2,125,722 | Hawkins | Aug. 2, 1938 |